(12) United States Patent
Strange et al.

(10) Patent No.: US 7,531,078 B1
(45) Date of Patent: May 12, 2009

(54) CHEMICAL PRINTING OF RAW ALUMINUM ANODE FOIL TO INDUCE UNIFORM PATTERNING ETCHING

(75) Inventors: Thomas F. Strange, Easley, SC (US); James L. Stevens, Liberty, SC (US); Xiaofei Jiang, Liberty, SC (US)

(73) Assignee: Pacesetter, Inc., Sunnyvale, CA (US)

( * ) Notice: Subject to any disclaimer, the term of this patent is extended or adjusted under 35 U.S.C. 154(b) by 548 days.

(21) Appl. No.: 11/036,576

(22) Filed: Jan. 13, 2005

(51) Int. Cl.
*C25F 3/16* (2006.01)
*H01G 4/00* (2006.01)

(52) U.S. Cl. .......................... 205/661; 216/6
(58) Field of Classification Search ................. 204/224; 205/661; 216/6
See application file for complete search history.

(56) References Cited

U.S. PATENT DOCUMENTS

| | | | | |
|---|---|---|---|---|
| 4,717,455 | A * | 1/1988 | Textor et al. | 205/213 |
| 4,968,389 | A * | 11/1990 | Satoh et al. | 205/106 |
| 5,405,493 | A | 4/1995 | Goad | 156/651 |
| 5,715,133 | A * | 2/1998 | Harrington et al. | 361/500 |
| 6,224,738 | B1 * | 5/2001 | Sudduth et al. | 205/221 |
| 6,426,146 | B1 * | 7/2002 | Ameen et al. | 428/413 |
| 6,785,123 | B2 * | 8/2004 | Keser | 361/509 |
| 7,452,473 | B1 * | 11/2008 | Hemphill et al. | 216/6 |
| 2002/0022146 | A1 * | 2/2002 | Keefer et al. | 428/630 |

FOREIGN PATENT DOCUMENTS

EP   0 665 310 B1   4/1997
WO   WO 03/009321 A1   1/2003

* cited by examiner

*Primary Examiner*—Harry D. Wilkins, III
*Assistant Examiner*—Nicholas A. Smith
(74) *Attorney, Agent, or Firm*—Steven M. Mitchell (57) ABSTRACT

A method of producing a highly etched electrode for a capacitor from a foil is disclosed. The method comprises first applying a composition to the foil to form a plurality of deposits on the foil surface. The method then includes heating the deposits to form micron-sized features and etching the foil. Preferably, the micron-sized features facilitate etching of the foil surface at the location of the micron-sized features. After etching, the foil is optionally further processed in a combination of optional steps such as widening, forming and finishing steps. The controlled application and heating of deposits on the foil surface allows for positional control of tunnel initiation during etching. Thus, the present invention relates to a method of controlling the etching of a foil, such that tunnel initiation density and the location of tunnel initiation is controlled. By controlling the position of tunnel initiation, foils are etched more uniformly and have optimum tunnel distributions, thus allows for the production of highly etched foils that maintain high strength and have high capacitance. The present invention further includes an electrolytic capacitor comprising etched aluminum anode foils, which have been prepared using the methods of the present invention.

20 Claims, 7 Drawing Sheets

CHEMICAL PRINTING OF RAW ALUMINUM ANODE FOIL TO INDUCE UNIFORM PATTERNING ETCHING

BACKGROUND OF THE INVENTION

1. Field of the Invention

The present invention relates to a method of producing an electrode for use in the manufacture of electrolytic capacitors and more particularly to a method of creating porous electrode foil for use in multiple electrode stack configuration electrolytic capacitors of the type used in implantable cardioverter defibrillators (ICDs).

2. Related Art

Compact, high voltage capacitors are utilized as energy storage reservoirs in many applications, including implantable medical devices. These capacitors are required to have a high energy density since it is desirable to minimize the overall size of the implanted device. This is particularly true of an implantable cardioverter defibrillator (ICD), also referred to as an implantable defibrillator, since the high voltage capacitors used to deliver the defibrillation pulse can occupy as much as one third of the ICD volume.

Electrolytic capacitors are used in ICDs because they have the most near ideal properties in terms of size, performance and ability to withstand relatively high voltage. Conventionally, an electrolytic capacitor includes an etched aluminum foil anode, an aluminum foil or film cathode, and an interposed kraft paper or fabric gauze separator impregnated with a solvent-based liquid electrolyte. The electrolyte impregnated in the separator functions as the cathode in continuity with the cathode foil, while an oxide layer on the anode foil functions as the dielectric. The entire laminate is rolled up into the form of a substantially cylindrical body, or wound roll, which is held together with adhesive tape and is encased, with the aid of suitable insulation, in an aluminum tube or canister. Connections to the anode and the cathode are made via tabs. Alternative flat constructions for aluminum electrolytic capacitors are also known, composing a planar, layered, stack structure of electrode materials with separators interposed therebetween.

Since these capacitors must typically store approximately 30-40 joules, their size can be relatively large, and it is difficult to package them in a small implantable device. Currently available ICDs are relatively large (over 32 cubic centimeters (cc)), generally rectangular devices about 12-16 millimeters (mm) thick. A patient who has a device implanted may often be bothered by the presence of the large object in his or her pectoral region. Furthermore, the generally rectangular shape can in some instances lead to pocket erosion at the somewhat curved corners of the device. For the comfort of the patient, it is desirable to make smaller and more rounded ICDs. The size and configuration of the capacitors has been a major stumbling block in achieving this goal.

In ICDs, as in other applications where space is a critical design element, it is desirable to use capacitors with the greatest possible capacitance per unit volume. Since the capacitance of an electrolytic capacitor increases with the surface area of its electrodes, increasing the surface area of the aluminum anode foil results in increased capacitance per unit volume of the electrolytic capacitor. By electrolytically etching aluminum foils, an enlargement of a surface area of the foil will occur. As a result of this enlargement of the surface area, electrolytic capacitors, which are manufactured with the etched foils, can obtain a given capacity with a smaller volume than an electrolytic capacitor, which utilizes a foil with an unetched surface.

In a conventional electrolytic etching process, surface area of the foil is increased by removing portions of the aluminum foil to create etch tunnels. The foil used for such etching is typically an etchable aluminum strip of high cubicity. High cubicity in the present context is where at least approximately 85% of crystalline aluminum structure is oriented in a normal position (i.e., a [100] orientation) relative to the surface of the foil. Such foils are well known in the art and are readily available from commercial sources. While electrolytic capacitors having anodes and cathodes comprised of aluminum foil are most common, anode and cathode foils of other conventional metals such as titanium, tantalum, magnesium, niobium, zirconium and zinc are also used.

U.S. Pat. No. 4,213,835 to Fickelscher discloses a method for electrolytically etching a recrystallized aluminum foil which allows manufacture of foils with exclusively pure cylindrical or cubical etching structures and tunnel densities greater than $10^7/cm^2$ with an avoidance of irregular pitting of the foil. The method consists of providing an etching bath containing chloride ions, positioning the foil in the bath and potentiostatically etching the foil with a temporally constant anode potential. The preferred etching step occurs in two stages. In the first stage, the etching current density is set above the potential or current density, which creates pitting of the aluminum. After an induction period of around 10 seconds, the etching tunnels grow autocatalytically at a rate of several µm/s with a pore diameter of approximately 0.2 µm in the crystal oriented direction (i.e., a [100] orientation relative to the surface of the foil). After approximately one minute of exclusive tunnel formation and in order to avoid the occurrence of coarse pitting, the etching current density is reduced. In the second stage, the current density is set below the current density, which creates pitting of the aluminum, such that only pore or tunnel enlargement up to the desired value will occur. Thus, the etching time for the tunnel enlargement is relatively long in relation to the etching time for obtaining the tunnel structure in the foil.

U.S. Pat. No. 4,420,367 to Löcher discloses a similar method for etching aluminum foil for electrolytic capacitors. Electrolytic tunnel formation is carried out in a first etching stage, as described above. However, the further etching for tunnel enlargement is non-electrolytic, taking place chemically in one or several etching stages. The method is preferably carried out in a halogen-free or chloride-free solution having nitrate ions, such as $HNO_3$ and/or $Al(NO_3)_3$.

U.S. Pat. Nos. 4,474,657, 4,518,471 and 4,525,249 to Arora disclose the etching of aluminum electrolytic capacitor foil by passing the foil through an electrolyte bath. The preferred bath contains 3% hydrochloric acid and 1% aluminum as aluminum chloride. The etching is carried out under a direct current (DC) and at a temperature of 75° C. U.S. Pat. No. 4,474,657 is limited to the above single step. U.S. Pat. No. 4,518,471 adds a second step where the etched foil is treated in a similar bath with a lower current density and at a temperature of 80-82.5° C. U.S. Pat. No. 4,525,249 adds a different second step, where the etched foil is treated in a bath of 8% nitric acid and 2.6% aluminum as a nitrate, at a temperature of 85° C.

The ideal etching structure is a pure tunnel-like etching with defined and uniform tunnel diameters and without any undesirable pitting of the foil. As tunnel density (i.e., the number of tunnels per square centimeter) is increased, a corresponding enlargement of the overall surface area will occur. Larger surface area results in higher overall capacitance. However, high gain etching of valve metals for use as anodes in electrolytic capacitors tend to produce very brittle anode foil. Typically the higher the gain of the anode foil, the more brittle the foil. In particular, the brittleness of the foil and its capacitance are both proportional to the depth of the etching and the density of the etch pits, i.e., the number per unit area. Accordingly, the capacitance and thereby the energy density are limited by the brittleness of the formed foil. As the brittleness of the formed foil increases, cracks formed in the foil more easily propagate across the foil, resulting in broken anodes. Therefore, there is a need for an improved method for etching anode foil that increases foil capacitance without decreasing foil strength.

SUMMARY OF THE INVENTION

In an embodiment, the present invention relates to a method for producing a highly etched foil, comprising forming a plurality of chemical deposits on the foil, heating the chemical deposits to form micron-sized features on the surface of the foil, and etching the foil.

In another embodiment, the present invention relates to a method for the positional control of tunnel initiation in the electrochemical etching of a metal foil, comprising forming a pattern of chemical deposits on at least one surface of the foil, heating the chemical deposits to form micron-sized features on the surface of the foil, and etching the foil electrochemically, wherein the tunnel initiation from the electrochemical etching is facilitated at the features.

In another embodiment, the present invention relates to a method for producing a high strength, high capacitance aluminum foil, comprising forming a plurality of chemical deposits on at least one surface of an aluminum foil, heating the chemical deposits to form micron-sized features on the surface of the foil; and etching the foil electrochemically to form tunnels, wherein the initiation of the tunnels is facilitated at the features.

It is to be understood that both the foregoing general description and the following detailed description are exemplary and explanatory and are intended to provide further explanation of the invention as claimed.

BRIEF DESCRIPTION OF THE FIGURES

The accompanying drawings, which are included to illustrate exemplary embodiments of the invention and are incorporated in and constitute a part of this specification, illustrate embodiments of the invention and together with the description serve to explain the principles of the invention. In the drawings.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Reference will now be made in detail to the embodiments of the present invention, examples of which are illustrated in the accompanying drawings.

Figure 1:
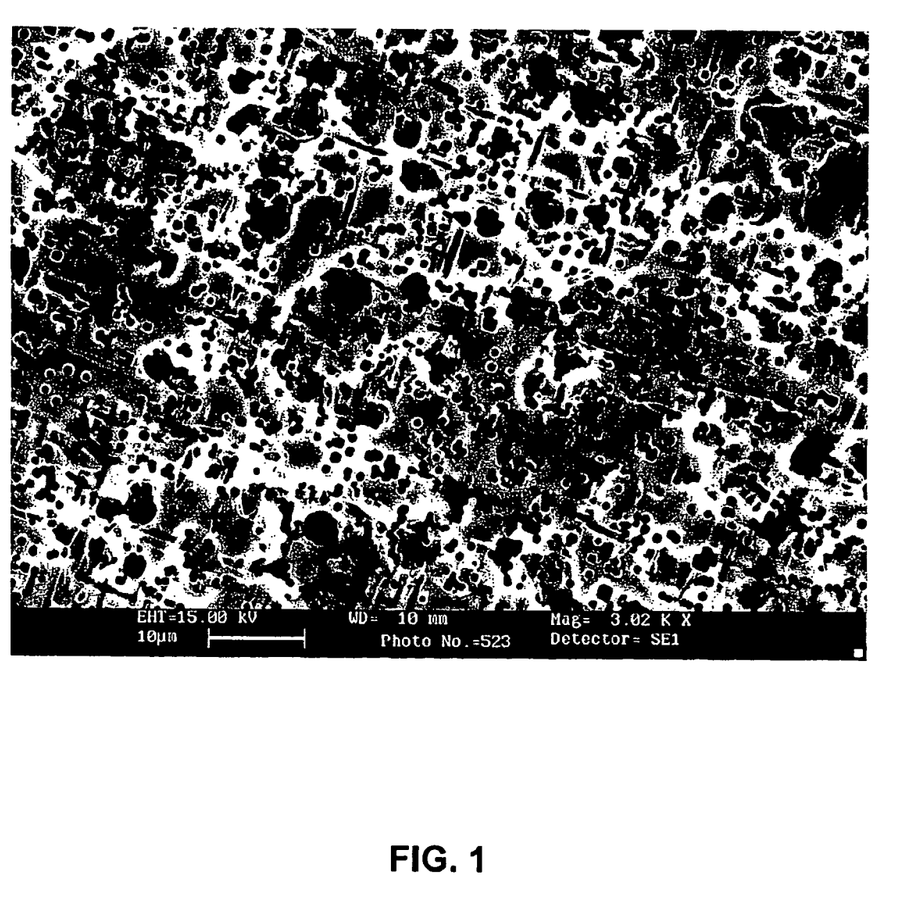
FIG. 1 is a Scanning Electron Microscope (SEM) picture of an aluminum foil electrochemically etched and widened using conventional methods.

Electrochemical etching of metal foil increases foil surface area and increases anodic foil capacitance. During the etching process tunnels are formed, by the electrochemical dissolution of metal from the foil, in the [100] direction, thereby increasing overall foil surface area. It is critical to control the morphology of the tunnels and their distribution, as the tunnels dictate the increase in surface area and capacitance. Tunnel morphology depends on the etch solution, etch temperature, current density, and many other factors known by those skilled in the art. However, the tunnel distribution after conventional etching processes is not uniform. FIG. 1 shows a foil that has been etched and widened using conventional processes. Areas on the foil, such as rolling lines (produced by the foil manufacturing process), have a high tunnel density, while other areas have little or no tunnel initiation. Merged tunnels are also seen in FIG. 1, and cause the foil to become brittle.

Figure 2:
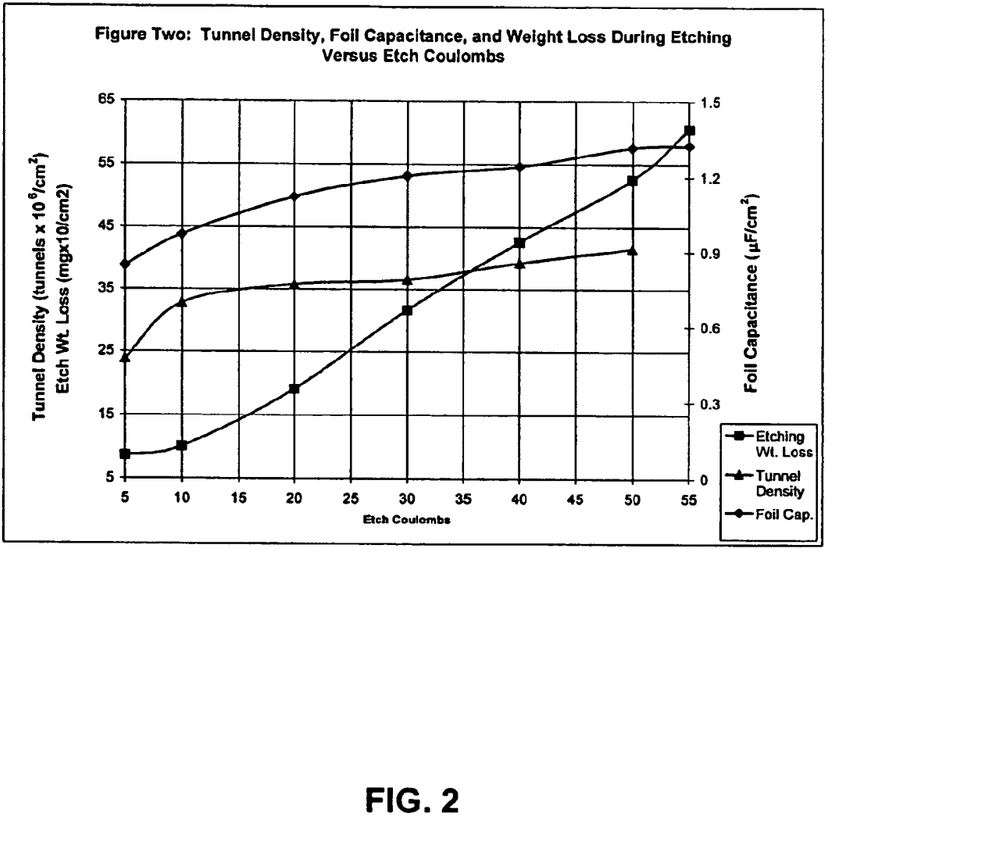
FIG. 2 shows a graph highlighting the effects of conventional etching processes on foil properties.

FIG. 2 shows a graph highlighting the effects of conventional etching processes on foil properties. Tunnel density (number of tunnels per $cm^2$), aluminum weight loss and foil capacitance are affected by the etch charge coulombs used during etching. As FIG. 2 shows, at high etch coulombs, the tunnels will merge and capacitance increases will level off at the areas of high tunnel density (high tunnel initiation). The efficiency of the etch coulombs (foil weight loss per coulomb) for increasing capacitance is reduced significantly at high etch coulombs. This clearly shows that even though high degrees of etching gives higher capacitance, ordered tunnel distribution is necessary to achieve the most efficient etching, which produces foils exhibiting both high capacitance and high strength.

Figure 3:
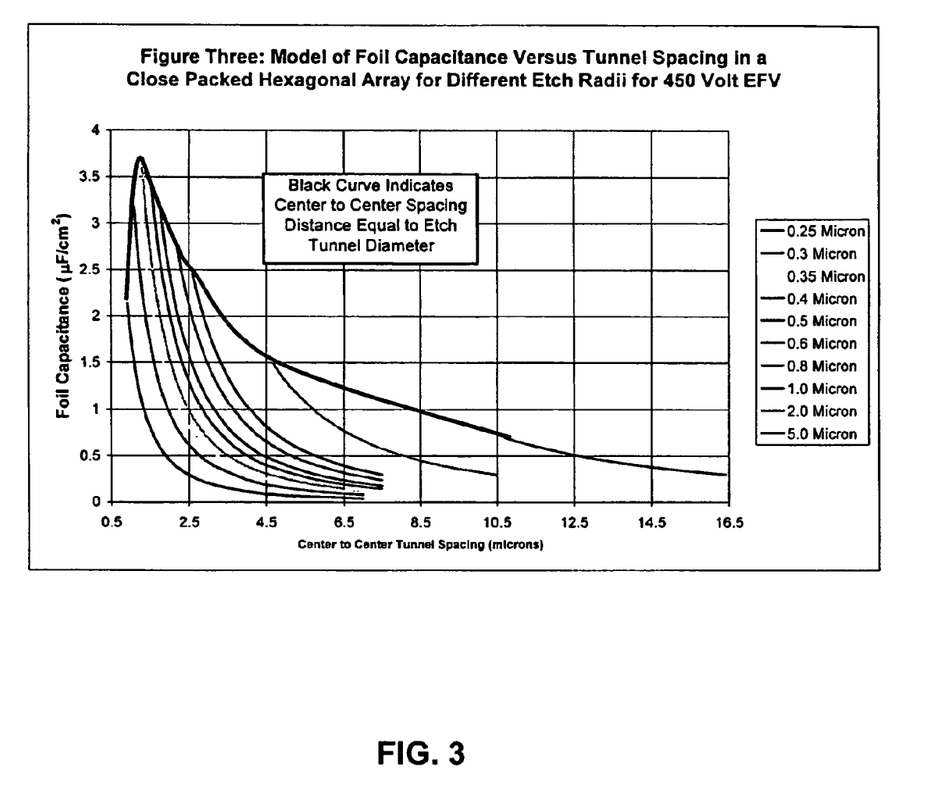
FIG. 3 shows results measuring capacitance versus tunnel spacing in a close-packed hexagonal array for different etching radii for a 450 Volt EFV (effective formation voltage) foils.

FIG. 3 shows the results of a theoretical study measuring capacitance versus tunnel spacing in a close-packed hexagonal array for different etching radii for a 450 Volt EFV (effective formation voltage) foils. The results for maximum foil capacitance, indicate that at the appropriate tunnel spacing in a hexagonal close-packed array, the foil capacitance can be doubled from the 1.4 microfarads at 450 Volt EFV currently produced using conventional processes. Theoretically, the capacitor size, therefore, could be significantly reduced and still deliver the same energy, or higher reliability designs could be implemented. Therefore, a pattern etch in this configuration could give a significantly improved capacitor. Thus, the present invention relates to a method of etching a foil, such that tunnel density and the location of tunnel initiation is controlled. By controlling the position of tunnel initiation, foils are etched more uniformly and have optimum tunnel distributions, thus allowing for the production of highly etched foils that maintain high strength and have high capacitance.

In an embodiment, the method includes forming a plurality of chemical deposits on the surface of the foil. The chemical deposits are composed of an organic compound, and optionally an oxidizer, that can be rapidly oxidized or combusted as discussed below. The pattern of deposits can be varied as needed, but an optional hexagonal array maximizes the capacitance of the resulting foil while maintaining high strength. The deposits are dried on the surface and then heated to the combustion point, where they ignite and create micron sized features on the surface of the foil.

Aluminum foil has a thin film of natural oxide on it, as a result of being exposed to air. The chemical deposits react with the underlying aluminum, damaging this natural oxide layer, and creating an abrupt oxide layer thickness difference. This oxide layer change creates an electrochemical discontinuity on the foil surface that is advantageous to tunnel initiation. Tunnel initiation is facilitated at the location of the micron-sized features, preferably inside said features. Forming the chemical deposits by micro contact printing, ink-jet printing, mechanical imprint, rubber stamping, lithography, etc., allows a pattern to be quickly established on the foil and cheaply activated prior to etch. After etching, the foil is further processed in a combination of optional steps such as widening, forming and finishing steps.

The foil is made from any electrically conductive material. According to the present invention, the foil may be used as an electrode in a capacitor, such as an anode or alternatively as a cathode. Anode and cathode foils may be made of metal, metal alloy, or a metal composite material, for example aluminum. Aluminum foils are well known in the art and are commercially available. In one example, the foil is aluminum with purity of at least about 99.96%, preferably about 99.98-99.99%, aluminum and at least about 80% cubic texture, and has thickness of about 50-200 μm, preferably about 110 μm. Alternative materials include but are not limited to zinc, zirconium, tantalum, magnesium, niobium, and alloys of any or all of these metals.

The chemical deposits to be formed on the foil surface can be any composition that will combust or oxidize with the foil surface upon heating. In one example, the chemical deposits comprise an organic compound, or mixture of compounds. Preferably, the chemical deposits are formed of organic compounds that can lose water or solvent and dry on the surface of the foil. Organic compounds for use in the present invention include, but are not limited to, alcohols, ethers, aldehydes, ketones, carboxylic acids, carboxylic esters, carbonates, anhydrides, urethanes, nitro-containing compounds, amides and combinations thereof. Specific examples include, but are not limited to, formic acid, butyric acid, propionic acid, stearic acid, and combinations thereof. The chemical deposits optionally further comprise an oxidizer. Examples of oxidizers for use in the present invention include, but are not limited to, nitric acid, sulfuric acid, chromic acid, perchlorate salts, persulfate salts, permanganate salts, chromate salts, peroxides and combinations thereof. Specific examples include, but are not limited to, perchlorate salts, such as sodium perchlorate, potassium perchlorate, ammonium perchlorate, combinations thereof, and the like. One specific example of a chemical deposit comprises about 25 wt % sodium perchlorate ($NaClO_4$) and about 75 wt % stearic acid, which will combust on a foil surface when heated to about 100° C.

The chemical deposit optionally further comprises other additives that facilitate the application of the deposit to the foil surface and/or the formation of the micron-sized features upon heating the chemical deposit. For example, the chemical deposits optionally further comprise water or solvent that can dry on the surface of the foil, liquefiers or binders, for example, surfactants, and dispersants, and the like.

The chemical deposits are applied to one or more surfaces of the foil. The chemical deposits may all comprise the same composition, or alternatively, a combination of chemical deposits comprises one or more different compositions.

Figure 4A:
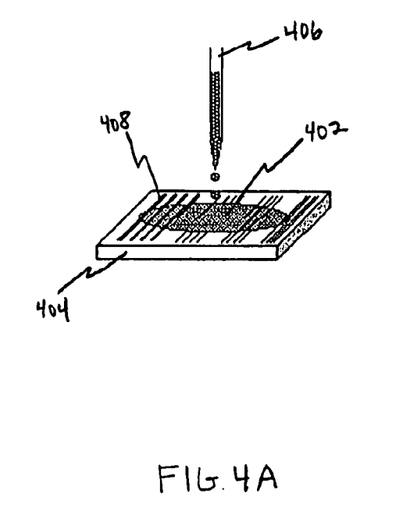
FIGS. 4A-4C show an exemplary method of forming chemical deposits on a foil surface, in accordance with an embodiment of the present invention.
Figure 4B:
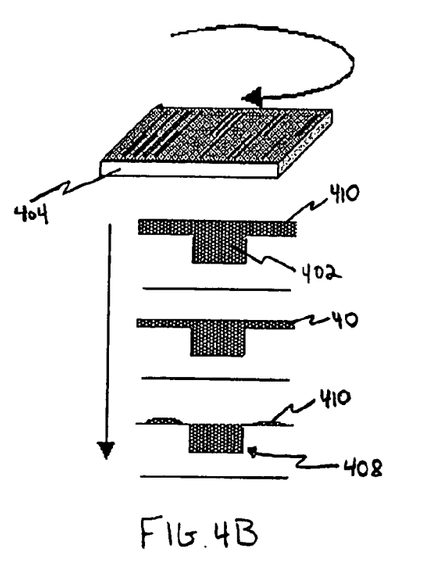
Figure 4C:
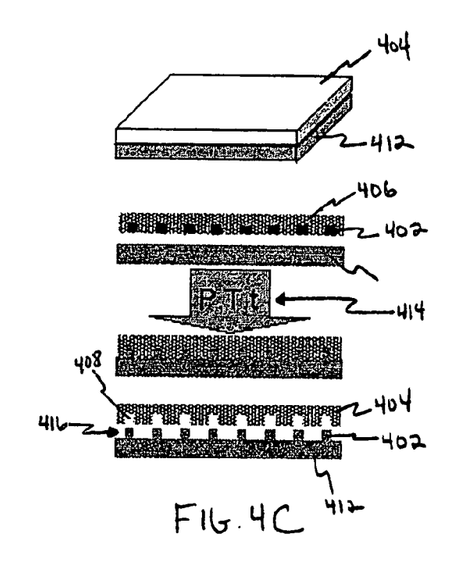

The deposits are applied to the foil in a predetermined regular pattern, or alternatively in an irregular pattern. The deposits can be applied using any method known to one of ordinary skill in the art. In one example, the deposits are applied using a stamp. Microcontact printing using a stamp is well known in the art. An example of a stamp for use in the present invention is the Dow Corning Sylgard 184 PDMS (polydimethylsiloxane) stamp. As shown in FIG. 4A, composition 402 is first applied to stamp 404 using applicator 406. Stamp 404 has channels or features 408 for collecting and transferring composition 402 to the foil. As shown in FIG. 4B, stamp 404 is then spun to evenly distribute composition 402 over the surface of the stamp. Excess composition 410 breaks up, thins, and is reduced and removed from the surface of stamp 404 during spinning. After spinning, excess composition 410 is substantially removed, leaving only composition 402, inside channels 408. As shown in FIG. 4C, stamp 404 is then contacted with one or more surfaces of foil 412. As is well known in the art, using predetermined conditions 414, of pressure (P), temperature (T) and time (t), stamp 404 is contacted with foil 412 to deposit composition 402, in predetermined pattern 416, on foil 412. For example, a light load of about 1-5 p.s.i. is applied for about 1-30 minutes, while gently heating to a temperature of about 30-50° C.

In another example, the composition is deposited on the foil surface using an electronic printer, for example, an ink-jet printer, or the like. The ink-jet printer can quickly and economically deposit any predetermined pattern, or any irregular pattern, on the foil surface. A computer-controlled machine may control the movement of the foil or printer. A pattern may be programmed into a computer and the foil sheet then marked using a computer controlled ink-jet printer. Thus, the invention allows for the production of detailed patterns of chemical deposits and resulting micron-sized features on the foil.

The chemical deposits can be any shape, including, but not limited to circular dots, stars, squares, diamonds, and other shapes. In one example, the chemical deposits are circular dots having about 0.5-2 μm diameter, preferably from about 1 μm. The spacing between the chemical deposits, in any regular or irregular pattern, is about 1-10 μm, preferably about 1.5-3 μm.

Figure 5A:
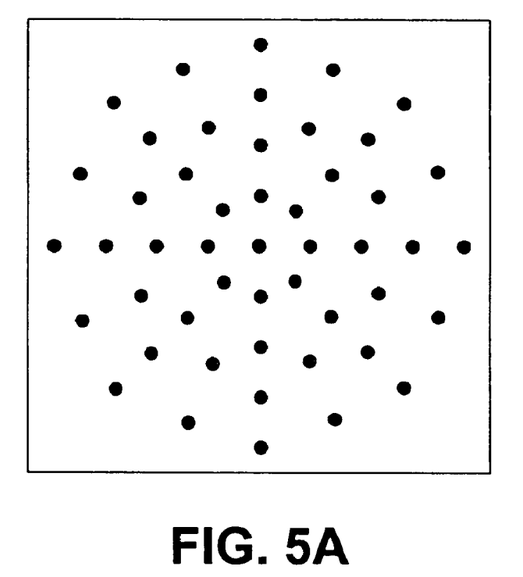
FIGS. 5A-5D show alternative patterns for chemical deposits on a foil using methods of the present invention.
Figure 5B:
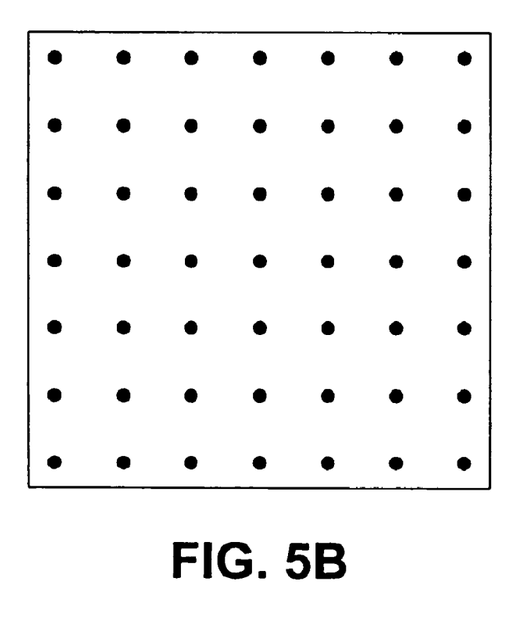
Figure 5C:
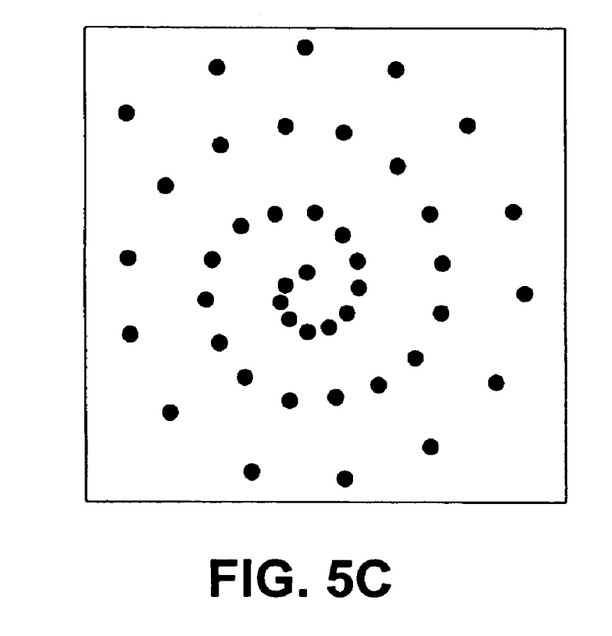
Figure 5D:
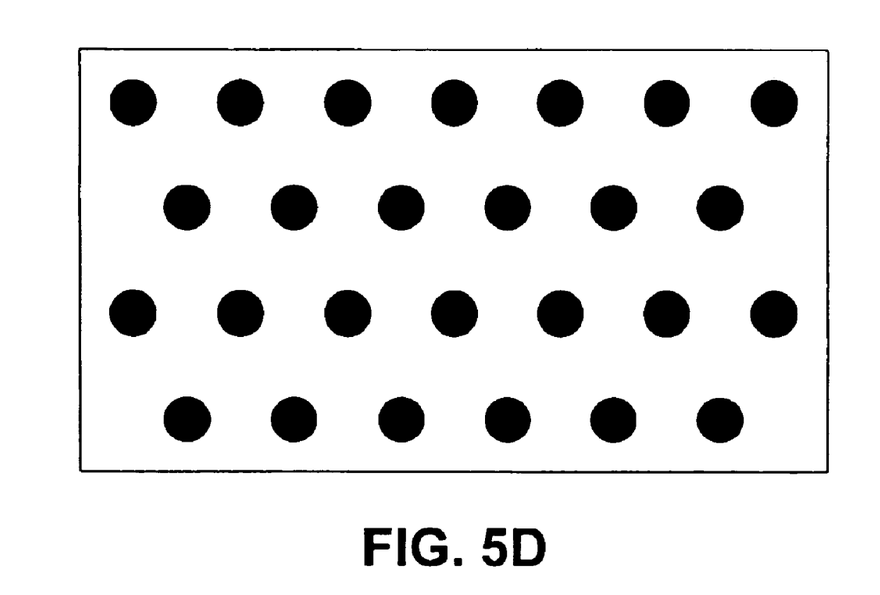

The patterns of chemical deposits on the foil can be any pattern, which includes, but is not limited to any regular, irregular or random pattern. For example, a series of chemical deposits in a line are formed across a foil. Alternatively, a plurality of chemical deposits are formed across the foil. Alternative patterns include, but are not limited to the patterns shown in FIGS. 5A-5D. FIG. 5A illustrates a design for a pattern in which chemical deposits are formed in lines emanating from the center of the foil. FIG. 5B shows a second pattern of lines of chemical deposits formed across the foil. FIG. 5C shows a third pattern in which a circle of chemical deposits with increasing diameter has been formed around the foil center. Preferably, the chemical deposits are formed on the foil surface in a close-packed hexagonal pattern, as shown in FIG. 5D. Alternatively, a foil is formed with a combination of patterns. A pattern is applied to one side of the foil. Alternatively, the pattern is applied to both sides of the foil or different patterns are applied to different sides of the foil.

After the chemical deposits are formed on the foil surface, the chemical deposits are heated to form micron-sized features. Any method known to one of ordinary skill in the art can be used to heat the chemical deposits. In one example, the chemical deposits are heated in an oven to a temperature sufficient to cause the organic compound(s) to ignite and burn on the foil surface, but below a temperature where the foil is heavily oxidized or annealed. In another example, the chemical deposits are heated to a temperature of about 50-500° C., and the foil is held in the heated oven for a time sufficient to form the micron-sized features. For example, the foil can be held in the heated oven for a time in the range of about 5 seconds to about 1 hour. Alternative methods of heating the deposits can be used to form the micron-sized features. For example, microwave radiation, infra-red radiation, or lasers may be applied to the deposits to heat the chemical deposits and form the micron-sized features.

As discussed above, the chemical deposits react with the underlying aluminum creating micron-sized features on the surface of the foil. Electrochemical etching is facilitated at the location of the micron-sized features. The rate of etching at the micron-sized features is greater or faster than the rate at which the bulk foil is etched. The micron-sized features include the product(s) and/or by-product(s) of the process of heating the chemical deposits.

Figure 6A:
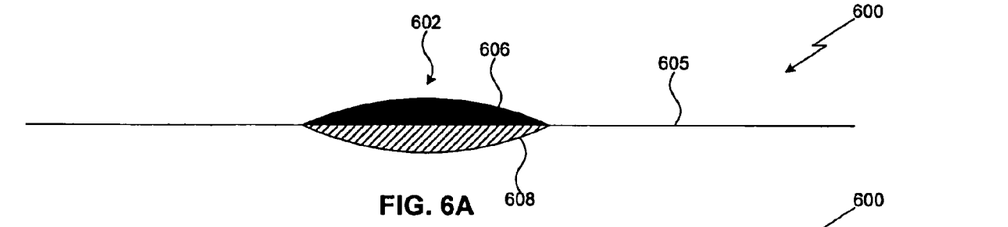
FIGS. 6A-6C show exemplary micron-sized features formed using methods of the present invention.
Figure 6B:
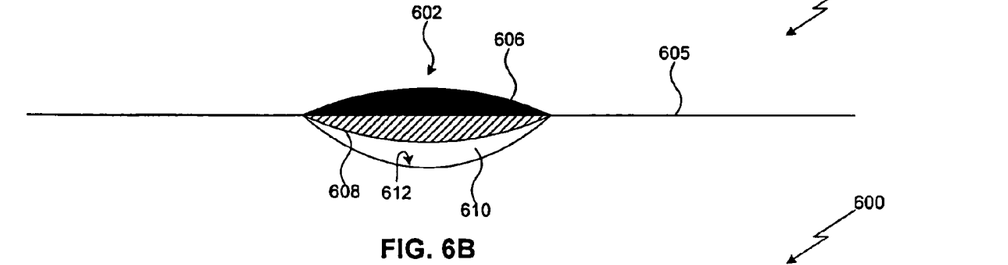
Figure 6C:
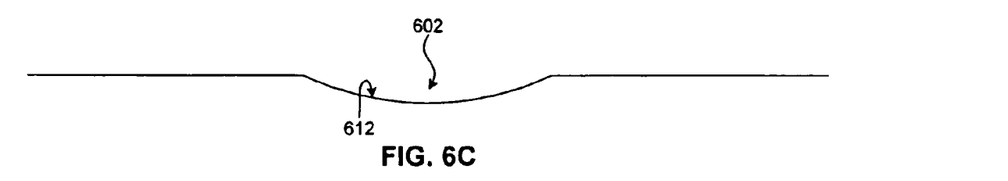

FIGS. 6A-6C show examples of a cross sectional diagram 600 including feature 602, formed in accordance with an embodiment of the present invention. In one example, as shown in FIG. 6A, the product or by-product can include remains of the heated chemical deposit 606 and portions of foil that are transformed during the heating step 608. In another example, as shown in FIG. 6B, the product or by-product can include remains of the heated chemical deposit 606, transformed foil 608 and voids or areas in which aluminum has been removed during the heating step 610. In another example, as shown in FIG. 6C, the product or by-product can include void spaces or pits 610. Void spaces or pits 610 expose fresh foil surface, 612. Fresh foil surface 612 etches at an increased rate compared to both products and/or by-products 606 and 608, and bulk foil 604. It is believed the fresh foil surface etches at an increased rate compared to bulk foil surface because the natural oxide present on the bulk foil surface passivates the surface and retards the etching rate. This process allows one to precisely control the position of tunnel initiation in electrochemical etching, because the rate of tunnel initiation will be higher at the location of the micron-sized features.

In another embodiment, therefore, the present invention relates to a method for the positional control of tunnel initiation in the electrochemical etching of a metal foil, comprising forming a pattern of chemical deposits on at least one surface of the foil, heating the chemical deposits to form micron-sized features on the surface of the foil, and etching the foil electrochemically, wherein the tunnel initiation from the electrochemical etching is facilitated at the features.

The size of the chemical deposit determines the size of the resulting micron-sized feature on the surface of the foil. It is preferred that the size of the features will result in an etched foil having high capacitance and high strength. Factors to consider in optimizing the feature size with foil capacitance and strength include, but are not limited to, the dimensions of the foil, the amount of charge used in etching the foil, the thickness of the foil, the type of foil used, and the composition used. If the feature size is large compared to the etch tunnel diameter, e.g. 20 µm, then many etch tunnels will initiate at or inside the same feature and the etch tunnels will merge during later processing steps. This decreases foil strength in these areas. Therefore, the optimal feature size leads to even distribution of tunnels across the entire surface of the foil. The feature size is preferably in the range from about 0.5-3 µm in diameter, preferably about 1 µm in diameter. In one example, the features are on the surface of the foil. Alternatively, the features are formed in the foil to a depth of about 0.1-2 µm deep in the foil.

Upon formation of the micron-sized features, the foil is etched. The foil is etched according to any method that increases the surface area, preferably electrochemical etching, as is known to one skilled in the relevant art. Other methods include, but are not limited to roughing the foil surface mechanically and chemical etching. Electrochemical etching increases the surface area of the foil by electrochemically removing portions of the foil to create etch tunnels.

In a preferred embodiment, the anode foil is etched in an aqueous halide based etch solution, preferably a hydrochloric acid or sodium chloride solution, according to a conventional etch process; for example, U.S. Pat. No. 5,715,133 to Harrington et al. describes a suitable method of etching foil and is incorporated herein by reference in its entirety. The etch solution preferably consists of about 1.5% by weight sodium chloride, about 3.0% by weight sodium perchlorate, about 3% by weight glycerin, 0.5% by weight sodium sulfate, and deionized water. The etch solution preferably is heated to a temperature in the range of about 60° C. to about 95° C., preferably 85° C. The foil is etched at a DC current density of about 0.01 A/cm$^2$ to about 0.50 A/cm$^2$, preferably about 0.15 A/cm$^2$. A charge of about 15 coulombs/cm$^2$ to 100 coulombs/cm$^2$, preferably about 30 coulombs/cm$^2$, is passed through the foil during the etching process, which requires an etch time in the range of about 2 minutes to about 12 minutes.

The invention also includes an etched anode foil produced by the methods described above. Anode foils are punched from etched anode sheets. Foil sheets etched in accordance with the present invention and the resulting anode foils exhibit high capacitance while maintaining high strength.

In practice, a capacitor assembly process is used to produce capacitors from etched foil. The assembly process includes depositing the composition and heating the deposits to form micron-sized features and etching as described above and a plurality of optional processing steps.

For example, after etching, the foil is removed from the etch solution and rinsed in deionized water. The tunnels formed during the initial etch are then widened, or enlarged, in a secondary etch solution, typically an aqueous based nitrate solution, preferably between about 1% to about 20% aluminum nitrate, more preferably between about 10% to about 14% aluminum nitrate, with less than about 1% free nitric acid. The etch tunnels are widened to an appropriate diameter by methods known to those in the art, such as that disclosed in U.S. Pat. No. 4,518,471 and U.S. Pat. No. 4,525,249, both of which are incorporated herein by reference.

After the etch tunnels have been widened, the foil is again rinsed with deionized water and dried. Finally, a barrier oxide layer is formed onto one or both surfaces of the metal foil by placing the foil into an electrolyte bath and applying a positive voltage to the metal foil and a negative voltage to the electrolyte. Preferably, the dielectric oxide layer is grown anodically in an aqueous formation electrolyte, with a minimum voltage that is 10% greater than the intended working voltage of the finished capacitor. The barrier oxide layer provides a high resistance to current passing between the electrolyte and the metal foils in the finished capacitor, also referred to as the leakage current. High leakage current can result in the poor performance and reliability of an electrolytic capacitor. In particular, high leakage current results in greater amount of charge leaking out of the capacitor once it has been charged.

The formation process consists of applying a voltage to the foil through an electrolyte such as boric acid and water or other solutions familiar to those skilled in the art, resulting in the formation of an oxide on the surface of the anode foil. The preferred electrolyte for formation is a 100-1000 µS/cm, preferably 500 µS/cm, citric acid concentration. In the case of an aluminum anode foil, the formation process results in the formation of aluminum oxide ($Al_2O_3$) on the surface of the anode foil. The thickness of the oxide deposited or "formed" on the anode foil is proportional to the applied voltage, roughly 10 to 15 Angstroms per applied volt.

The etched and formed anode foils are cut and the capacitor is assembled. It is understood to one of ordinary skill in the art that additional steps, or an alternative combination of steps, can be used in processing an etched anode foil. Additional steps include, but are not limited to rinsing, drying, hydrating, capacitance testing, annealing, and capacitor assembling. These steps can be carried out using any method known to one skilled in the art.

In another embodiment, the present invention relates to an electrolytic capacitor comprising etched aluminum anode foils, which have been prepared using the methods of the present invention. Such capacitors can be made using any suitable methods known in the art. Non-limiting examples of such methods are disclosed, e.g. in the following references: U.S. Pat. Nos. 4,696,082 to Fonfria et al., 4,663,892 to Kenmochi, 3,872,579 to Papadopoulos, 4,541,037 to Ross et al., 4,2676,332 to Markarian et al., 3,622,843 to Vermiyea et al., and 4,593,343 to Ross, each of which is incorporated herein by reference.

Electrolytic capacitors manufactured with anode foils etched according to the present invention may be utilized in ICDs, such as those described in U.S. Pat. No. 5,522,851 to Fayram, incorporated herein by reference. The increased capacitance per unit volume of the electrolytic capacitor will allow for a reduction in the size of the ICD.

While the invention has been particularly shown and described with reference to preferred embodiments thereof, it will be understood by those skilled in the art that various changes in form and details may be made therein without departing from the spirit and the scope of the invention.

What is claimed is:

1. A method for producing a highly etched foil, comprising:
   (a) forming a plurality of chemical deposits on said foil;
   (b) heating said chemical deposits to a sufficient temperature to combust said chemical deposits to form micron-sized features on the surface of said foil; and
   (c) etching said foil, wherein etching is facilitated at the location of said micron-sized features as compared to the remaining bulk foil.

2. The method of claim 1, wherein said chemical deposits comprise one or more oxidizable or combustible organic compounds.

3. The method of claim 2, wherein said chemical deposits further comprise an oxidizing agent.

4. The method of claim 2, wherein said forming step comprises:
   (1) applying said organic compound to a surface of a stamp; and
   (2) contacting said stamp with one or more surfaces of said foil to form said chemical deposits on said foil.

5. The method of claim 2, wherein said forming step comprises applying said organic compound with an ink-jet printer.

6. The method of claim 2, wherein said organic compound is selected from the group consisting of an alcohol, ether, aldehyde, ketone, carboxylic acid, carboxylic ester, carbonate, anhydride, urethane, nitro-containing compound, amide and combinations thereof.

7. The method of claim 2, wherein said organic compound is selected from the group consisting of formic acid, butyric acid, propionic acid, stearic acid and combinations thereof.

8. The method of claim 2, wherein said oxidizing agent is selected from the group consisting of nitric acid, sulfuric acid, chromic acid, perchlorate salt, persulfate salt, permanganate salt, chromate salt, a peroxide and combinations thereof.

9. The method of claim 2, wherein said oxidizing agent is selected from the group consisting of sodium perchlorate, potassium perchlorate, ammonium perchlorate and combinations thereof.

10. The method of claim 1, wherein said chemical deposits are circular, having diameter about 0.5-2 $\mu$m.

11. The method of claim 1, wherein said chemical deposits are formed in a close-packed hexagonal array.

12. The method of claim 1, wherein said chemical deposits are formed on said foil with about 1-10 $\mu$m separation between said chemical deposits from center-to-center.

13. The method of claim 1, wherein said heating step comprises heating said chemical deposits to a temperature of about 50-500° C.

14. The method of claim 1, wherein said etching step comprises:
   etching said foil electrochemically;
   wherein said etching is facilitated inside said micron-sized features.

15. The method of claim 1, wherein said foil is an aluminum foil.

16. A method for the positional control of tunnel initiation in the electrochemical etching of a metal foil, comprising:
   (a) forming a pattern of chemical deposits on at least one surface of said foil;
   (b) heating said chemical deposits to a sufficient temperature to combust said chemical deposits to form micron-sized features on the surface of said foil; and
   (c) etching said foil electrochemically;
   wherein said tunnel initiation from said electrochemical etching is facilitated at said features as compared to the remaining bulk foil.

17. The method of claim 16, wherein said chemical deposits are circular, having diameter about 1-10 $\mu$m.

18. The method of claim 17, wherein said chemical deposits are formed in a close-packed hexagonal array.

19. The method of claim 18, wherein said chemical deposits are formed with about 1-10 $\mu$m separation between said micron-sized features from center-to-center.

20. A method for producing a high strength, high capacitance aluminum foil, comprising:
   (a) forming a plurality of chemical deposits on at least one surface of an aluminum foil;
   (b) heating said chemical deposits to a sufficient temperature to combust said chemical deposits to form micron-sized features on the surface of said foil; and
   (c) etching said foil electrochemically to form tunnels;
   wherein the initiation of said tunnels is facilitated at said features as compared to the remaining bulk foil.

* * * * *